May 26, 1959  C. F. HIGH  2,888,002
FUEL INJECTION SYSTEM
Filed Dec. 7, 1956  3 Sheets-Sheet 1
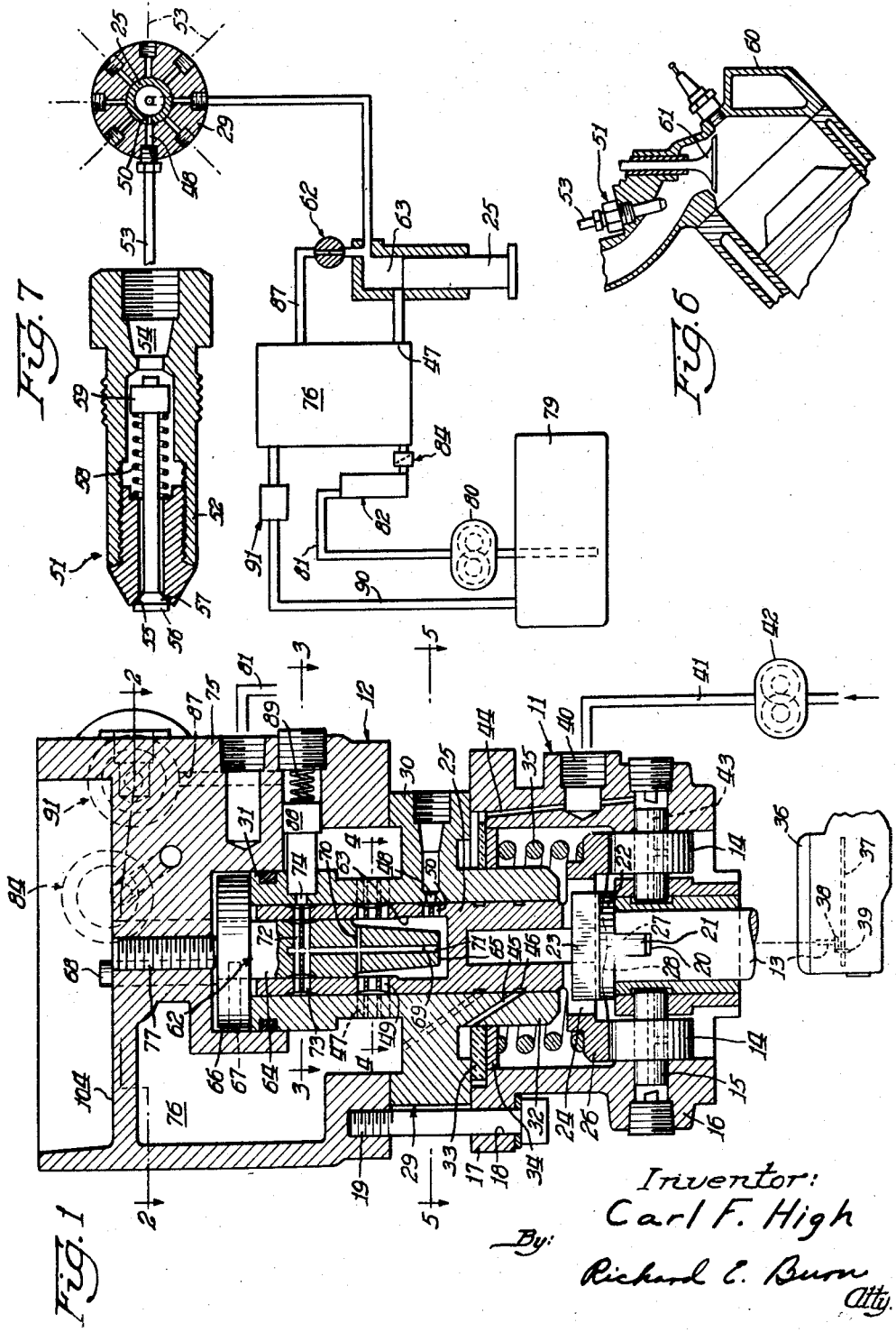
Inventor:
Carl F. High
By:
Richard E. Burn
Atty.

May 26, 1959 C. F. HIGH 2,888,002
FUEL INJECTION SYSTEM
Filed Dec. 7, 1956 3 Sheets-Sheet 2
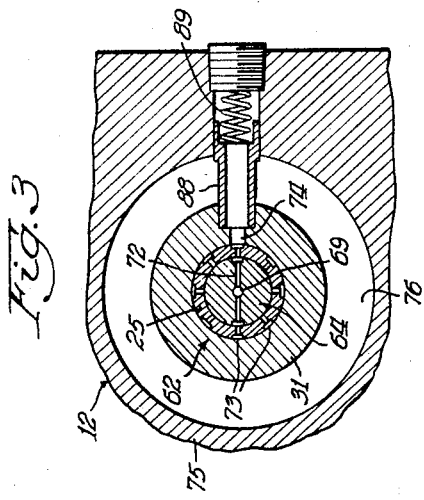
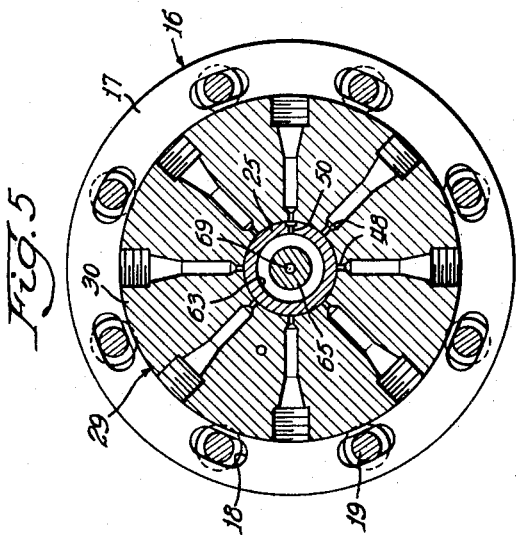
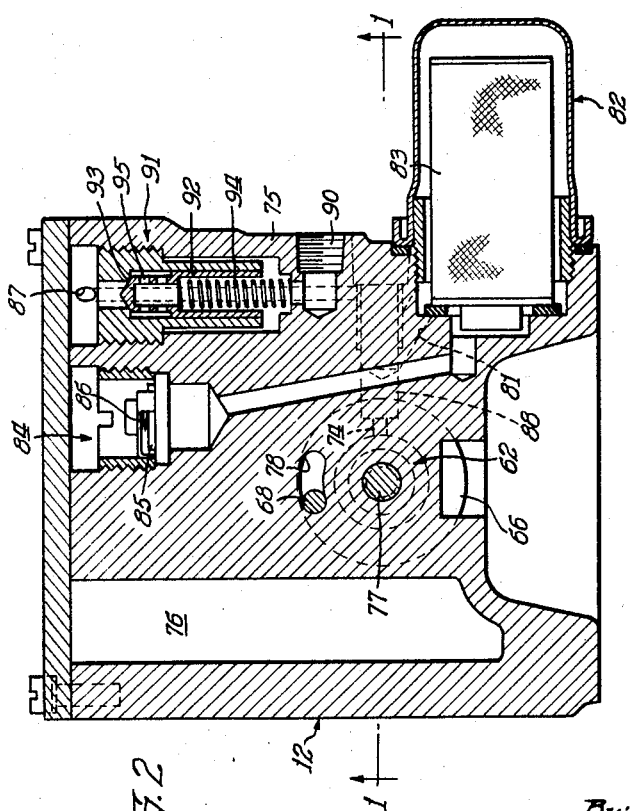
Inventor:
Carl F. High
By: Richard E. Burr
Atty.

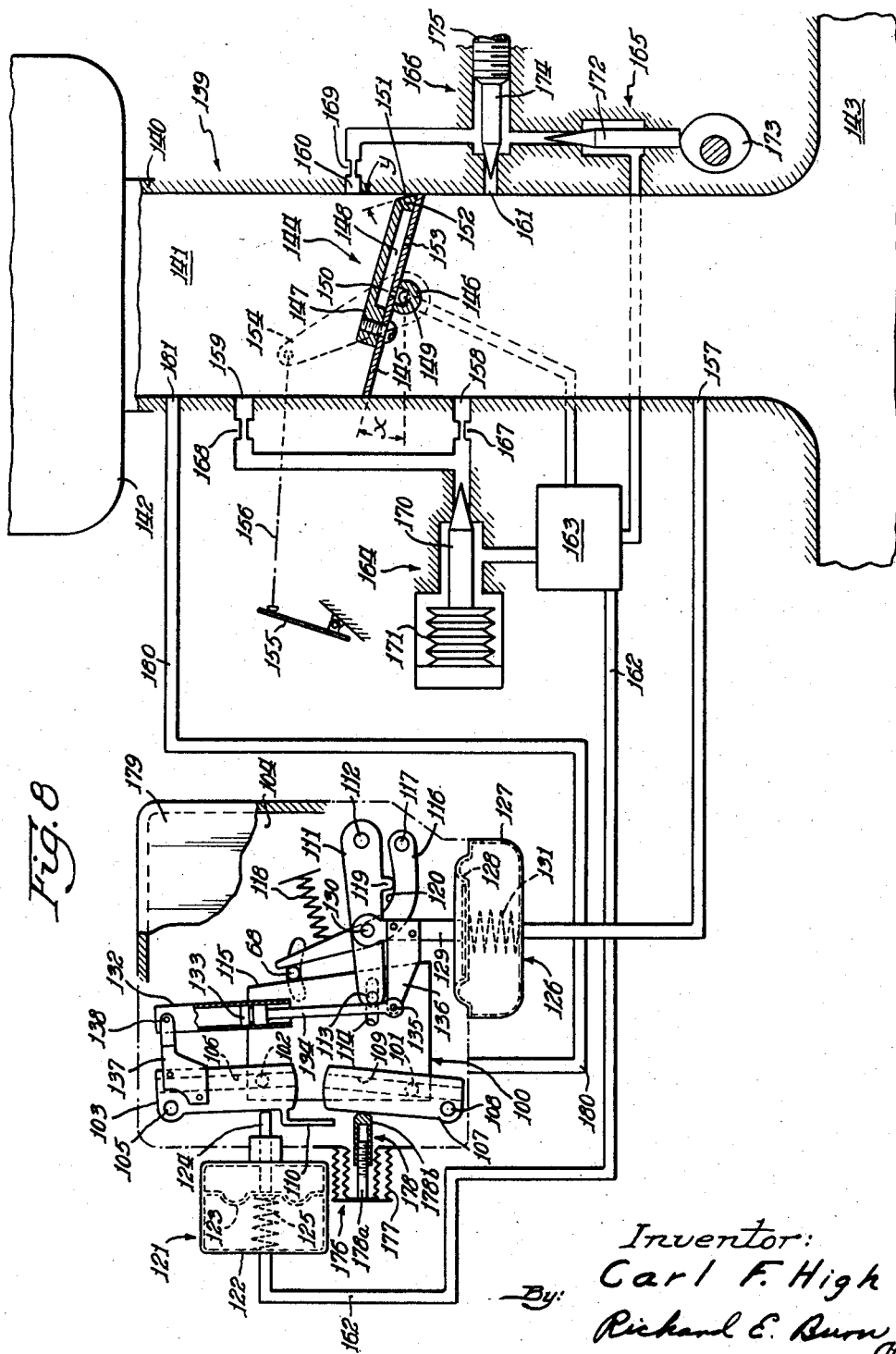

United States Patent Office

2,888,002
Patented May 26, 1959

2,888,002

FUEL INJECTION SYSTEM

Carl F. High, Detroit, Mich., assignor to Borg-Warner Corporation, Chicago, Ill., a corporation of Illinois Application December 7, 1956, Serial No. 626,905

6 Claims. (Cl. 123—140)

My invention relates to fuel injector control mechanism particularly for use in automotive vehicles.

It has heretofore been proposed to provide a fuel injector pump supplying fuel to fuel nozzles positioned adjacent the cylinder of an automotive vehicle internal combustion engine with the pump being controlled in accordance with the load on the engine and also in accordance with the speed of the engine. The pump is more particularly controlled in accordance with the manifold pressure of the engine which varies in accordance with the load on the engine and is controlled also by means of the volume and speed of the air flowing into the manifold that varies with engine speed, so that the output of the injector pump is increased as the load increases and is decreased as the engine speed increases.

Under ordinary operating conditions, the above described fuel injector pump supplies the correct amount of fuel to the internal combustion engine; however, I have found that under decelerating conditions, such an engine speed and engine load control supplies too great an amount of fuel to the engine causing the emission of unburned hydrocarbon from the engine with a resultant noxious odor and waste of fuel.

It is accordingly an object of the present invention to provide an auxiliary control for the fuel injector pump which materially decreases the output of the pump under decelerating conditions.

In a preferred embodiment of the invention, two vacuum motors are used for controlling the positioning of a cam effective on a control pin that changes the output of the injector pump. One of the vacuum motors is connected with the engine manifold so as to be responsive to the engine load and the other vacuum motor is connected to orifices adjacent a throttle fly valve in the air intake passage of the internal combustion engine so that a vacuum varying in amount with engine speed is impressed on the motor. The engine load responsive motor preferably moves the cam longitudinally and the engine speed responsive motor preferably moves the cam transversely.

In connection with such fuel injector mechanism, it is an object to provide auxiliary lever mechanism responsive to the manifold connected vacuum motor which acts to move the control pin toward a reduced fuel supply position when the vacuum in the manifold is reduced below a certain predetermined value. It is contemplated that this motor shall be sufficiently strong so as to move the control pin toward a reduced fuel output position against the action of the other motor supplying transverse movement to the cam.

My fuel injector controls constitute improvements over those disclosed and claimed in an application by Einar S. Dahl and Robert M. McCreary, S.N. 608,269 filed September 6, 1956 and those disclosed and claimed in an application by Einar S. Dahl, S.N. 608,578, filed September 7, 1956.

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

Fig. 1 is a vertical sectional view of the fuel discharge pump and which is taken on line 1—1 of Fig. 2;

Fig. 2 is a top sectional view of the discharge pump taken on line 2—2 of Fig. 1;

Figs. 3, 4 and 5 are sectional views taken on lines 3—3, 4—4 and 5—5 of Fig. 1 respectively;

Fig. 6 is a sectional view through the vehicle driving internal combustion engine;

Fig. 7 is a schematic view showing the hydraulic connections in the fuel injection pump and with parts associated with the pump; and Fig. 8 is a schematic view showing controlling mechanism for the fuel injection pump and which is associated with the air throttle valve of the internal combustion engine.

Like characters of reference designate like parts in the several views.

Referring now to the drawings, the illustrated fuel injection apparatus comprises a drive section 11 and a pumping section 12 mounted thereon. The drive section 11 comprises a drive shaft 13 and a plurality of rollers 14 which serve as cam followers. These rollers are rotatably disposed on pins 15 all mounted in a base casing 16. The base casing 16 is provided with a flange 17 which has elongated holes 18 by means of which the base casing is adjustably attached to the pumping section 12 by means of bolts 19. The drive shaft 13 is provided with a slot 20 on its upper end for receiving the tang 21 of a coupling member 22 rotatably mounted in the base casing 16. The coupling member 22 is provided with an upwardly extending tang 23 fitting in a slot 24 in the base of a plunger 25 to effect the continuous rotation of the latter.

The plunger 25 is formed on its lower end with a face cam 26 having a plurality of lobes 27 and a plurality of depressions 28 therebetween. A pump body 29 having a peripheral flange 30 and upper and lower tubular parts 31 and 32 is disposed with its flange 30 clamped by means of the bolts 19 between the drive section 11 and the pumping section 12. An insulator washer 33 which may be of fibre, for example, rests beneath the flange 30, and a guide collar 34 is disposed beneath the insulator washer 33. A compression spring 35 is disposed between the face cam 26 and the guide collar 34, holding the face cam on the rollers 14.

The drive shaft 13 is driven from the internal combustion engine 36 of the vehicle, particularly from the cam shaft 37 of this engine, which as is well-known, rotates at one-half the speed of the engine crankshaft. A gear 38 is fixed on the shaft 13, and a gear 39 in mesh with the gear 38 is fixed to the cam shaft 37 so that the gears 39 and 38 drive the shaft 13 at one-half the speed of rotation of the engine crankshaft.

The base casing 16 is provided with a port 40 which is connected by any suitable means, such as a conduit 41, with the oil pump 42 of the engine 36. A passage 43 is connected with the port 40 for supplying oil to the rollers 14 and to the shaft 13 for lubricating the latter parts. A passage 44 is also connected to the port 40 and supplies lubricating oil around the insulator washer 33 to a passage 45 in the tubular portion 32 and thereby to an external groove 46 in the plunger 25. The fuel, such as gasoline, used in the injection apparatus may leak downwardly on the external surface of the plunger 25 above the groove 46, and the presence of lubricating oil in the groove 46 under the pressure from the pump 42 acts as a block or dam preventing flow of the fuel farther downwardly around the plunger 25 and eventually into the supply of engine lubricating oil.

The pump body 29 is provided with intake ports 47 and discharge ports 48 which register respectively with opposite intake ports 49 and discharge ports 50 in the plunger 25. There are as many discharge ports 48 as there are cylinders of the internal combustion engine 36, and each of the ports 48 is connected to a nozzle 51 directing fluid into the engine 36. Each of the nozzles 51 comprises a nozzle body 52 connected by means of a fluid conduit 53 with one of the ports 48. The nozzle body 52 is provided with an internal passage 54 therein having an outwardly flared seat 55 at its outer end. A valve plunger 56 is disposed in the nozzle body 52 and is provided with an outwardly flared seat 57 adapted to rest and seal on the surface 55. A spring 58 is disposed between a shoulder in the nozzle body 52 and a sleeve 59 fixed on the plunger 56 for yieldably holding the valve plunger 56 on the seat 55.

Each of the nozzles 51 is disposed in the head 60 of the engine 36 and is adapted to spray fuel into the air stream to an intake valve 61. It will, of course, be understood that the nozzles 51 can instead be directed to spray fuel directly into the explosion cavities for the cylinders or else into the engine intake manifold as is well-known.

A metering valve 62 is disposed in a cylindrical cavity 63 in the plunger 25. The metering valve 62 comprises a cylindrical portion 64 and a tapered end portion 65. A round metering valve head 66 is fixed to the metering valve 62 by means of a pin 67. The metering valve head 66 has fixed thereon an upwardly extending metering valve pin 68. The metering valve 62 is provided with a longitudinally extending passage 69 therein connected with ports 72 in the cylindrical portion 64 of the valve 62. The ports 72 are in alignment with ports 73 in the plunger 25 and with a port 74 in the tubular part 31.

The pumping section 12 comprises a casing 75 which forms, with the pump body 29, a liquid fuel sump 76. An adjustable screw 77 extends downwardly through the casing 75 into contact with the valve 62, and the pin 68 extends upwardly through a slot 78 in the casing 75.

The injector pump is supplied with liquid fuel, such as gasoline, from a gasoline tank 79. The conventional fuel supply pump 80 draws fuel through a fuel line 81 from the tank 79 and supplies it to a fuel filter 82 which is of conventional construction comprising a filtering element 83 through which fuel flows and is filtered. A check valve 84 is connected to receive fuel from the fuel filter and comprises a disc 85 yieldably held on a seat by means of a spring 86. The check valve 84 discharges into the sump 76.

The plunger 25, as will be hereinafter described, receives fuel from the sump 76 through the ports 47 and discharges it through the pump body 29 and conduits 53 to the nozzles 51. The valve 62, depending on the rotative positioning of the valve, allows a certain variable amount of the fluid discharged by the plunger 25 to flow through a parallel passage 87 back to the fuel sump 76. The passage 87, which may be formed in the casing 75, comprises a sleeve 88 held in communication with the port 74 by means of a spring 89.

A fuel return conduit 90 is provided connecting the sump 76 with the fuel tank 79, and a pressure regulator valve 91 is disposed in the conduit 90. The pressure regulator valve 91 comprises a pointed piston 92 held yieldably in place on a seat 93 by means of a spring 94. The piston 92 has ports 95 therethrough which are in connection with the conduit 90 and the fuel tank 79.

In operation, the engine 36 drives the driving shaft 13 of the injector pump through the cam shaft 37 and the gears 39 and 38, rotating the shaft 13 at one-half the speed of the crankshaft of the engine 36. The plunger 25 is rotated through the coupling 22; and the face cam 26, in having its lobes 27 and depressions 28 riding over the rollers 14, causes the plunger 25 to reciprocate. It will be noted that for an eight-cylinder engine and for eight of the nozzles 51, there are accordingly eight lobes 27 and eight depressions 28 in the face cam 26 causing the plunger 25 to reciprocate up and down eight times for each two revolutions of the engine crankshaft. It is assumed at this point that a four-stroke cycle engine 36 is being used—if the fuel injector mechanism is used with a two-stroke cycle engine, then the shaft 13 will be driven at such a speed so that there are eight reciprocations of the plunger 25 for each revolution of the engine crankshaft.

Fuel is maintained in the sump 76 at a relatively low pressure, for example, 20 lbs. per square inch for a particular embodiment of the fuel injection mechanism. The fuel supply pump 80 which may be driven from the engine 36 or may be driven from any auxiliary source of power such as the vehicle electrical system, is of conventional construction and draws fuel out of the fuel tank 79 and discharges it through the fuel filter 82 and the check valve 84 into the sump 76, maintaining the fuel in the sump 76 at this relatively low pressure. The fuel filter 82 is of conventional construction and simply filters the fuel. The valve 84 is a simple check valve and simply prevents back flow out of the sump 76 into the line 81.

The fuel in the sump 76 flows under this relatively low pressure through the ports 47 and 49 into the cylindrical cavity 63 of the plunger 25. As the plunger 25 begins to reciprocate upwardly by reason of the rollers 14 riding on lobes 27, the ports 49 in the plunger 25, due to the rotation of the plunger, move out of alignment with the ports 47. Continued upward reciprocation of the plunger 25 causes a compression of the fuel within the cylinder 63 below the valve 62, and this fuel is forced through the ports 50 and one of the ports 48 and the connected conduit 53 and nozzle 51. It should be noted that the ports 50 are in register with one of the ports 48 during the continued upward reciprocation of the plunger 25 after the ports 47 have been closed, until the upper end of the reciprocation of the plunger 25.

The fuel discharged through one of the conduits 53 and the associated nozzle 51 is at a relatively high pressure, as compared to the pressure of the fluid in the sump 76, perhaps being on the order of 200 to 1000 lbs. p.s.i. in one particular embodiment of the fuel injection system, and this fuel under pressure moves the valve plunger 56 off the seat 55 against the action of the spring 58 causing the fuel to spray outwardly of the nozzle 51.

The valve 62 is adjustably rotated, with its pin 68 moving in the slot 78, to variably relieve the pressure within the cylinder 63 of the plunger 25 as the plunger reciprocates upwardly. As will be noted, there is one port 74, and there are two ports 72, but only one of the latter is active; and there are eight ports 73. When the pin 68 is at one limit of its movement in the slot 78, with the valve head 66 rotated to the limit of its movement counterclockwise, as seen in Fig 2, as the plunger 25 reciprocates upwardly, one of the ports 72 is in register with the ports 73 and also with the port 74, so that all of the fuel under pressure in the cavity 63 generated by upward reciprocation of the plunger 25 flows through the ports 71 and 70, the passage 69, the ports 72, 73 and 74 and the passage 87 for discharge back into the sump 76.

On the other hand, when the valve head 66 is moved to the limit of its movement clockwise, as seen in Fig. 2, with the pin 68 at the other limit of its movement in the slot 78, then the ports 72 are out of register with the ports 73 as the plunger 25 reciprocates upwardly. In this case, there can be no relief of fuel out of the cylinder 63 through the ports 72, 73 and 74, and the fuel is discharged at required pressure through the ports 50 and 48 and one of the nozzles 51.

At intermediate points of adjustment of the pin 68 between these two, at which the pin 68 is between the limits of its movement in the slot 78, there is more or less of the fluid in the cavity 63 tending to be compressed by the upward reciprocation of the plunger 25 relieved through the ports 72, 73 and 74. This is due to the fact that, in these cases, the ports 72 and 73 are aligned for only a portion of the upward reciprocation of the plunger 25, more and more of the fluid pressure tending to be generated toward the upper end of the reciprocation being relieved by the ports 72 and 73 as the pin 68 and the valve head 66 are swung counterclockwise as seen in Fig. 2.

The control system for the fuel injection pump comprises a cam plate 100 having two pins 101 and 102 fixed therein. A cam plate guide 103 is pivotally disposed on a surface 104 by means of a pin 105. The cam plate guide 103 is provided with a groove 106 therein which receives the pin 102 carried by the cam plate 100.

A second cam plate guide 107 is pivotally disposed on the surface 104 by means of a pin 108, and this guide 107 has a groove 109 therein receiving the pin 101. An arm 110 is carried by the cam plate guide 103 for at times contacting and moving the guide 107.

A lever 111 swingingly mounted on the surface 104 by means of a pin 112 carries a pin 113 at its end which is received in a groove 114 in the cam plate 100. The cam plate 100 is provided with a slanted cam surface 115, and the control pin 68 rests on this surface 115.

A lever 116 pivotally mounted on the surface 104 by means of a pin 117 rests on the control pin 68, being urged in this direction by a compression spring 118. The lever 111 carries a boss 119 which rests on a bowed intermediate portion 120 of the lever 116.

A vacuum motor 121 is provided for controlling the cam plate guide 103. The vacuum motor 121 comprises a casing 122 and a flexible diaphragm 123 within the casing. The diaphragm is connected by means of a rod 124 with the cam plate guide 103. A spring 125 is provided for yieldably holding the diaphragm 123 and rod 124 to the right as seen in Fig. 8.

A vacuum motor 126 is provided for actuating the lever 111. The motor 126 comprises a casing 127 and a flexible diaphragm 128 disposed in the casing 127. The diaphragm 128 is connected by means of a link 129 with the lever 111, being fixed with respect to the lever by means of a pin 130. A spring 131 is provided for urging the lever 111 upwardly as seen in Fig. 8.

A yielding connection is provided between the rod 129 and the cam guide plate 103 which comprises a tube 132 closed on one end and a piston 133 slidably disposed loosely therein. The piston 133 is connected by means of a connecting rod portion 134 extending through the open end of the tube and a pin 135 with a bracket 136 fixed on the rod 129. The tube 132 is swingably mounted and connected to the cam guide plate 103 by means of a bracket 137 fixed to the guide 103 and a pin 138 pinning the tube 132 and bracket 137 together.

The vacuum motors 121 and 126 are controlled by suitable connections to the air throttle valve 139 for the vehicle engine. The air throttle valve comprises a casing portion 140 having an air passage 141 extending downwardly therethrough. A conventional air cleaner 142 is provided on top of the air passage 141, and the passage 141 leads to the conventional intake manifold 143 connected to the cylinders of the internal combustion engine.

An air throttle fly valve 144 is provided in the air passage 141. The valve 144 comprises a thin plate 145 fixed on a throttle shaft 146 rotatably disposed in the casing portion 140. An auxiliary throttle plate member 147 is fixed on the plate 145 and has an internal passage 148 therein. The passage 148 is in communication with a passage 149 extending through the shaft 146, the connection being by means of an opening 150. The auxiliary member 147 has a slanted end 151 with a restricted opening 152 therein communicating with the passage 148. A restricted opening 153 is also provided through the plate 145 into the passage 148. The shaft 146 has the usual throttle lever 154 fixed thereon adapted to be controlled by the vehicle accelerator 155 by means of any suitable connecting mechanism such as the rod 156.

The vacuum motors 121 and 126 are controlled from orifices 157, 158, 159, 160 and 161 all opening into the air passage 141. The vacuum motor 121 is connected by means of a conduit 162 with a chamber 163. The chamber 163 is connected with the passage 149 in the throttle rod 146, with the orifice 158 by means of a valve 164 and also with the orifice 159 through the valve 164. The chamber 163 is also connected with the orifice 161 through valves 165 and 166, and the orifice 160 is also connected with the valve 165 as shown. A restricted jet 167 is disposed in the orifice 158; a restricted jet 168 is disposed in the orifice 159; and a restricted jet 169 is disposed in the orifice 160.

The valve 164 comprises a pointed plunger 170 more or less closing the orifices 159 and 158 with respect to the chamber 163, and the piston 170 is actuated by a sylphon 171 comprising an accordion-like sheet metal structure filled with fluid that expands and contracts with temperature, so that the piston 170 is moved to close the orifices 158 and 159 with respect to the chamber 163 to a greater extent as the temperature increases. The sylphon 171 is particularly responsive to engine temperature, being subject to the temperature of the exhaust manifold of the engine for example.

The valve 165 comprises a pointed valve element 172 actuated by a cam 173 fixed on the throttle rod 146. The cam 173 is so formed that the valve 165 is closed when the fly plate 145 opens from idling position beyond a small opening, for example, 6 degrees.

The valve 166 comprises a pointed valve element 174 disposed on a screw 175 so that the valve element may be manually adjusted.

The cam guide 107 is controlled in its swinging movement by means of an altitude and ambient temperature correction device 176. This device comprises a sylphon structure 177 having a rod 178 carried thereby and effective on the cam guide plate 107. The sylphon 177 is partially filled with a liquid and partially with a gas. The liquid is responsive to temperature so that the rod 178 is moved to the left as seen in Fig. 8 when the temperature increases due to the action of the liquid, while the gas in the sylphon forces the rod 178 in this direction, also, when the altitude at which the device is disposed increases with a resultant decrease in atmospheric pressure. It should be noted that the rod 178 is formed of a threaded central part 178a and an internally threaded sleeve 178b for adjustability purposes.

The cam 100, the guides 103 and 107 and the motors 126 and 121 are preferably within a closed casing 179. I vent this casing by means of a conduit 180 with an orifice 181 located in the air passage 141 beneath the air cleaner 142 for assuring that the same value of atmospheric pressure exists within the casing 179 as in the air passage 141 beneath the air cleaner 142.

In operation, the vacuum motor 121 is responsive to the speed of operation of the vehicle engine particularly due to the orifices 152 and 153 in the throttle valve assembly 144. As has been previously noted, the passage 149 in the throttle valve shaft 146 is connected with the chamber 163 and thereby with the motor 121. Due to the orifices 152 and 153 in the throttle fly assembly 144, the pressure in the chamber 163 varies with the speed of the vehicle engine and with the mass of air that passes through the passage 141. The orifices 152 and 153 cooperate in order to provide this variation of pressure in the chamber 163 as follows: The orifice 153, being on the lower face of the plate 145 is always subject to pure manifold pressure. When the plate 145 is closed, the orifice 152 is subject only to atmospheric pressure existing below the air cleaner 142. Since manifold pressure is less than atmospheric pressure, air flows through the orifice 152, the passage 148 and the orifice 153 into the manifold 143. The pressure existing in the passage 148 is thus intermediate between these two pressures and is transmitted without change through the orifice 150 and the passage 149 to the chamber 163 and thereby to the motor 121.

As the throttle assembly 144 is opened, the slanted end 151 becomes more parallel with the sides of the air passage 141 and becomes increasingly subject to manifold pressure instead of the atmospheric pressure existing above the plate 145. Thus, as the plate 145 is swung open, the flow through the orifice 152 and the orifice 153 gradually decreases, and the pressure in the passage 148 which is applied to the motor 121 thus gradually decreases from the intermediate pressure mentioned above to the manifold pressure. It has been found that the pressure in the passage 148 varies inversely with the flow of air through the passage 141 and with the speed of the engine.

In one particular installation good results were obtained when the orifice 152 had a diameter of .070 inch and the orifice 153 had a diameter of .067 inch. The angle Y existing between the end 151 of the assembly 144 and the side of the passage 141 in the idling position of the throttle valve was 15 degrees. At this time, the angle X was 10 degrees this angle being that angle of the plate 145 with a normal through the throttle passage 141.

Due to the fact that the orifice 152 is increasingly subject to manifold pressure as the plate 145 is rotated, it should be noted that the change in pressure in the passage 148 is quite smooth and gradual, and this pressure changes in accordance with engine speed until the plate 145 has reached approximately 35 degrees throttle opening from its engine idling position.

The vacuum motor 126 being connected directly with the orifice 157 in the manifold 143 is thus subject to the manifold vacuum which varies directly with the load on the vacuum engine. Both the motor 121 subject to engine speed and the motor 126 subject to engine load vary the output per stroke of the plunger 25 as will be described.

It is a well-known fact that internal combustion engines do not have the same volumetric efficiency at all speeds in their working speed range. That is, the mass of air taken into each cylinder during each suction stroke will be less at higher r.p.m. than at low r.p.m., and engines will not necessarily require the same amount of fuel per revolution at high speeds as at lower speeds. It is likewise a known fact that the desired fuel-air ratio does not necessarily remain constant through the speed range for any given load, for example, one-quarter, one-half or full load.

The controls, therefore, vary the amount of fuel per revolution of the engine in relation to its speed as well as in relation to its load. The two influences, namely, engine speed and the load on the engine are such that when acceleration is desired and a rich mixture is advantageous, then, both influences tend to move the metering pin 68 and its valve 62 toward rich positions; and since these influences are both acting in the same direction, they move these parts toward rich mixture faster than either one alone can. When a leveling outpoint of load is reached, then the manifold pressure forces remain constant, and the forces responsive to speed adjust the mixture as required by speed variations only.

The position of the cam 100 in the grooves 106 and 109, that is, the vertical position of the cam 100 as seen in Fig. 8 determines to a large degree the positioning of the rotating valve pin 68 which, as previously explained, causes variation of the output of the plunger 25. The cam plate 100 has its position modified by the positions of the cam guides 103 and 107 which are respectively movable about the pins 105 and 108, as will be described.

The motors 126 and 121 function to move the pin 68 in a clockwise direction for the purpose of increasing the rate of discharge of the plunger 25 per stroke when the load on the engine as evidenced by a change in manifold pressure increases or when the speed of the engine decreases. As has been previously explained, the pressure in the conduit 162 increases as the speed of the engine decreases. This increasing pressure is effective on the diaphragm 123 of the motor 121 causing the plunger 124 to swivel the cam guide 103 counterclockwise about the pin 105, and the guide 103 acting through the pin 102 moves the cam 100 to the right, thus moving the pin 68 clockwise as seen in Figs. 2 and 8 and increasing the output from the plunger 25 per stroke to the nozzles 51. Conversely, as the air flow in the the passage 141 and the engine speed increase, the pressure in the conduit 162 decreases, and the spring 118 is effective to move the cam 100 to the left so that the pin 68 moves oppositely and decreases the output of the plunger 25 per stroke.

The manifold pressure is effective through the port 157 on the diaphragh 128 of the motor 126, and as the load increases, the manifold pressure increases moving the cam 100 upwardly through the rod 129 and the lever 111, the pins 101 and 102 moving in the grooves 106 and 109 of the guides 103 and 107. The control pin 68 moves along the slanted cam surface 115 and is moved thereby clockwise so as to increase the output from the plunger 25 to the nozzles 51. Conversely, as the load decreases, the manifold pressure as applied to the diaphragm 128 decreases, and the cam 100 is moved in the opposite direction, so that the pin 68 moves counterclockwise under the influence of the spring 118 effective on the lever 116 to decrease the output of the plunger 25 per stroke.

The valve 164 and the orifices 158 and 159 are provided for modifying the speed responsive pressure in the conduit 162 under engine warm-up conditions, that is, when the engine is relatively cold. With cold engine, the sylphon 171 which is responsive to the engine temperature maintains the valve 170 open, and the orifices 158 and 159 respectively below and above the throttle plate 145 are then effective to change the pressure in the chamber 163. The orifice 159, being above the plate 145, is subject to atmospheric pressure; and the orifice 158, being below the plate 145, is subject to manifold pressure. This results in an air-flow from the orifice 159 to the orifice 158 through the jets 168 and 169, which are about the same in diameter. The resultant pressure between these jets is slightly more than pressure in the passage 149 in the throttle valve 144, and when the slightly higher pressure from the jets is admitted, through the valve 164 to the chamber 163, the pressure in the conduit 162 applied to the motor 121 is increased slightly, thus acting through the guide 103 and the cam 100 on the pin 68 to slightly increase the output of the plunger 25. As is well-known, a cold engine requires more fuel than when hot, and the valves 164 accomplishes this function. When the engine becomes heated up, the sylphon 171 closes the valve 164, and thereafter the pressure effective on the motor 121 is that due to the throttle assembly 144 exclusive to any change by the orifices 158 and 159.

It is preferable to cause an increase in the pressure in the chamber 163 and in the conduit 162 beyond that due to the throttle assembly 144 when the accelerator 155 is in a relatively relaxed position. The valve 165 cooperating with the orifices 161 and 160 function for this purpose. The increase in pressure in the conduit 162 acts through the motor 121 to cause an increase in the output of the plunger 25, to take care of idling conditions of the engine which, as is well-known, require a greater amount of fuel per revolution of the crank shaft than at higher speed conditions.

It is contemplated that the valve plunger 174 under all conditions shall open the orifice 161 to some extent. Since the orifice 160 is above the throttle plate 145 and the orifice 161 is below the plate 145, there is a flow of air from the orifice 160 to the orifice 161 similarly as between the orifices 159 and 158 previously explained. This results in a pressure which is transmitted through the valve 165, when the latter is opened, that is, slightly greater than the pressure that exists in the passage 149, so that the pressure in the chamber 163 is increased slightly from that due only to the throttle assembly 144, thus increasing the output of the plunger 25. The orifices 160 and 161 are effective only under idling conditions, for example, when the throttle plate is not opened more than 6 degrees from its idling position, due to the functioning of valve 165. The cam 173 is so arranged that the piston 172 is opened when the throttle plate 145 is opened less than 6 degrees, so that the pressure influence from the orifices 160 and 161 is effective on the pressure in the chamber 163 only below the 6 degrees opening of the throttle plate 145.

Under engine idling conditions, there is a small amount of air that passes around the edges of the plate 145 as well as through the orifices 152 and 153. In addition, air also flows from the orifice 160 to the orifice 161 and the exact amount of this air flow may be adjusted by adjusting the screw 175 to adjust the air flow to the manifold 143 for engine idling condition. The adjusting screw 175 and the valve piston 174 also have an influence on the change in the pressure in the chamber 163 due to the functioning of the orifices 160 and 161, and this is the principal reason for the adjustable valve 166. The fuel requirements for individual engines under idling conditions differ, and the specific amount of fuel supplied to any one individual engine can be exactly adjusted under idling conditions by adjusting the screw 175.

The purpose of the tube 132 and the piston 133 therein is to momentarily increase the output by the plunger 25 when the accelerator 155 is depressed to accelerate the vehicle. On the opening of the throttle plate 145 caused by such a movement of the accelerator 155, the manifold pressure as applied to the motor 126 suddenly increases and moves the lever 111 and the cam 100 upwardly as seen in Fig. 8 so that the slanted side 115 on the cam 100 moves the control pin 68 clockwise toward its rich position. This movement of the cam 100, however, is not sufficient under vehicle accelerating conditions; and, therefore, the piston 133 acting in the closed tube 132 acts through the bracket 137 to swing the guide 103 counterclockwise about its pin 105. This movement of the guide 103 also tends to move the cam 100 toward the right by means of the pin 102.

I have found that this movement of the guide 103 in itself is not completely sufficient for moving the control pin 68 clockwise toward its rich position, and I, therefore, have provided the arm 110 carried by the guide 103 which, when the guide 103 rotates counterclockwise, contacts the guide 107 and causes the guide 107 to move in the clockwise direction about its pin 108. Such movement of the guide 107 through the pin 101 causes additional movement of the cam 100 to the right so as to cause still further movement of the control pin 68 clockwise toward its rich position. Such movements of the guides 103 and 107 together thus provide the additional movement of the control pin 68 toward its rich position that is necessary for giving the proper rich fuel mixture to the internal combustion engine for quick acceleration. The arm 110 is provided particularly so that the cam 100 will be moved substantially to the right under accelerating conditions regardless of whether the cam 100 is in a lowermost position (see Fig. 8) corresponding to light loads or is in an upper position corresponding to heavy loads.

As has been previously mentioned, the piston 133 fits in the tube 132 loosely. This is so that air leaks past the piston, and eventually, the piston 133 is of no effect on the cam guides 103 and 107 to increase the fuel output by the plunger 25 to the nozzles 51, after the momentary enriched fuel supply is obtained for accelerating conditions.

In order to substantially reduce the supply of fuel to the engine 36 when the accelerator is released so as to avoid an undue waste of fuel and the output of unburned hydrocarbons from the vehicle under decelerating conditions, I have provided on lever 111 the boss 119 acting on the lever 116. The boss 119 acting on the lever 116 functions to move the control pin 68 toward a position of minimum output by the plunger 25 during decelerating or when the vehicle is in effect driving the engine. Ordinarily, when the engine is driving the vehicle, the pressure in the motor 126 never decreases below a pressure of 8 inches of mercury; however, when the vehicle is coasting and the vehicle is driving the engine, the pressure in the motor 126 decreases below this pressure, for example, to from 6 to 7 inches of mercury. This decrease in pressure in the motor 126 is effective to swing the lever 111 downwardly about its pin 112 and move the lever 116 counterclockwise by means of the boss 119. The lever 116, in so moving, acts against the control pin 68 and moves the control pin 68 to a minimum fuel delivery position. The cam 100 moves to the left allowing this movement of the pin overcoming the bias of the spring 125.

Under these conditions, the force due to the motor 126, and particularly the manifold vacuum operating on its diaphragm 128, is stronger than the force from the motor 121 particularly due to the spring 125 so that the lever 116 moves the control pin 68 toward a minimum fuel delivery position. It should be noted that the interconnection by the motors 126 and 121 is by virtue of the curved lever 116 which, with the boss 119 acting on it, is a lever of multiplication to increase the small movement of the diaphragm 128 under the influence of the vacuum due to vehicle deceleration or vehicle coasting to a multiplied or greater movement, so as to cause movement of the control pin 68 and the cam 100 against the inhibiting effect of the motor 121. It is contemplated that under these conditions, there may be a complete fuel cut-off from the fuel injection pump.

The deceleration cut-off lever 116 acted on by the lever 111 and the motor 126 advantageously moves the control pin 68 to its zero pump output position whenever the vacuum applied to the diaphragm 128 of the motor 126 drops below a predetermined value, as at a sudden throttle closing at high engine speed. A similar movement of the control pin 68 by means of the lever 116 to a fuel shut-off position is obtained when the vehicle is coasting and thereby driving its engine, with the engine acting as a brake. The excess supply of fuel to the internal combustion engine usually obtained with conventional fuel systems under these conditions is thus obviated so that the engine does not exhaust unburned hydrocarbons and cause well-known smog and undesirable odors. My improved deceleration control also thus acts to save fuel by thus reducing the fuel supplied to the vehicle engine under decelerating conditions.

The interconnection between the cam guides 103 and 107 by means of the arm 110 assures that on accelerating conditions, a sufficiently increased output of the fuel injection pump is obtained, regardless of the longitudinal positioning of the cam 100. The arm 110 functions in this manner by assuring that both the cam guides 103 and 107 are moved, the former counterclockwise and the latter clockwise so as to move the cam 100 to move the control pin 68 to increase the fuel discharged by the injection pump.

The sylphon 176 functions to move the control pin 68 toward a greater fuel output position when atmospheric pressure increases and the ambient temperature decreases. As has been previously described, the sylphon 176 is responsive to the ambient temperature of the vehicle and is responsive to the atmospheric pressure (therefore being responsive to changes in altitude). The fluid within the sylphon 176 expands as the temperature increases and moves the plunger 178 to the left, and the sylphon 176 expands when the atmospheric pressure decreases (with higher altitude) to move the plunger 178 in the same direction. The plunger 178 is effective on the guide 107, and when the plunger 178 moves to the left, the cam guide 107 will swing counterclockwise, allowing movement to the left of the cam 100, the metering pin 68 and the lever 116 due to the action of the spring 118. Thus, under these conditions of higher altitude or increased temperature, the fuel output to the nozzles 51 of the plunger 25 will be reduced. Conversely, the sylphon 176 increases the output of the plunger 25 to the nozzles when the altitude decreases or temperature decreases.

The length of the rod 178 may be adjusted by rotating the sleeve 178b on the innermost part 178a. The rod 178 is so adjustable in order to properly position the control pin 68 to provide a desired maximum output from the plunger 25 to the nozzles 51.

In the hydraulic connections to the sump 76, the purpose of the pressure regulator valve 91 is to maintain the fuel under the desired low pressure in the sump 76. When the pressure in the sump 76 increases beyond this desired low pressure, the piston 92 moves off its seat 93 against the action of the spring 94 allowing flow of fuel from the sump 76 around the seat 93 and through the ports 95 and conduit 90 to the tank 79. The purpose of the check valve 84 is to prevent undesired flow out of the sump 76 back through the filter 82 and pump 80. The disc 85 seals on its seat under the action of the spring 86 to prevent such reverse flow.

Although I have herein described movement of the cam 100 upwardly and downwardly with reference to Fig. 8, it will be understood that this has been done only for the purpose of convenience of expression with reference to this particular figure and that the surface 104 is preferably approximately horizontal, as this surface is shown in other figures.

I wish it to be understood that the invention is not to be limited to the specific constructions and arrangements shown and described, except only insofar as the appended claims may be so limited, as it will be understood to those skilled in the art that changes may be made without departing from the principles of the invention. In particular, I wish it to be understood that although I have herein mentioned certain specific values as examples, such as for the fuel pressure and sizes of orifices, my invention is not to be limited to any such specific values.

I claim:

1. In a fuel injection apparatus for an internal combustion engine of an automotive vehicle having an air intake manifold, the vacuum in which decreases to a certain value under vehicle driving conditions and decreases to a certain lower value when the vehicle drives the engine, the combination of a fuel delivery pump adapted to supply fuel to the engine, a vacuum responsive motor connected to said manifold, a movable control element for increasing and decreasing the output of said pump, a cam effective on said control element and connected with said vacuum motor so as to respectively increase and decrease the output of said pump as the vacuum decreases and increases above said certain value, and lever mechanism connected with said motor for moving said control element to a position for less pump output than under the control of said cam when the vacuum in said manifold decreases to said lower value when the vehicle is driving the engine.

2. In a fuel injection apparatus for an internal combustion engine of an automotive vehicle having an air intake manifold, the combination of a fuel delivery pump adapted to supply fuel to the engine and having a control element movable in opposite directions for respectively increasing and decreasing the fuel discharged by the pump, a cam effective on said control element for increasing and decreasing the fuel discharged, a vacuum motor connected with the air intake manifold of the vehicle engine and connected with said cam so as to respectively increase and decrease the output of the pump as the manifold vacuum decreases and increases, and means mechanically connected with said vacuum motor and effective on said control element and thereby on said cam so as to move the control element toward a position for lower pump output when the vacuum in said manifold decreases below a certain value.

3. In a fuel injection apparatus for an internal combustion engine having an air inlet passage connected with an inlet manifold, the combination of a fuel delivery pump adapted to supply fuel to the engine and having a control element movable for increasing and decreasing the fuel output of the pump, a vacuum motor connected with said manifold so as to be responsive to changes in manifold pressure and thereby with engine load, a second vacuum motor connected with orifices provided in said passage so as to have a vacuum thereon varying with the speed of the engine, means for controlling the position of said control element and connected with both said vacuum motors so that the fuel output of said pump is increased in accordance with decreasing engine speed and increasing engine load, and auxiliary mechanism connected with said first-named vacuum motor for moving said pump control element to a position for minimum pump output when the vacuum in said manifold decreases below a predetermined value.

4. In a fuel injection apparatus for an internal combustion engine having an air inlet passage connected with an inlet manifold, the combination of a fuel delivery pump adapted to supply fuel to the engine and having a control element movable for increasing and decreasing the fuel output of the pump, a vacuum motor connected with said manifold so as to be responsive to changes in manifold pressure and thereby with engine load, a second vacuum motor connected with orifices provided in said passage so as to have a vacuum thereon varying with the speed of the engine, a cam acting on said control element for changing the output of the pump and connected with both of said motors so as to be moved thereby in directions transverse to each other so that the pump output is increased with increasing engine load and is decreased with increasing engine speed, and a lever connected with said first vacuum motor and effective on said control element so as to move the control element to a position of minimum pump output when the vacuum in said first motor decreases below a certain value moving said control element and said cam against the action of said second motor.

5. In a fuel injection apparatus for an internal combustion engine having an air inlet passage connected with an inlet manifold, the combination of a fuel delivery pump adapted to supply fuel to the engine and having a control element movable for increasing and decreasing the fuel output of the pump, a first vacuum motor connected with said manifold so as to be responsive to changes in manifold pressure and thereby with engine load, a second vacuum motor connected with orifices provided in said passage so as to have a vacuum thereon varying with the speed of the engine, a cam acting on said control element for changing the output of the pump, means connecting said motors to said cam whereby said cam is adapted to be moved longitudinally by said first motor and moved transversely by said second motor so that the pump output is increased with increasing engine load and is decreased with increasing engine speed, and a lever connected with said first vacuum motor and effective on said control element so as to move the control element to a position of minimum pump output when the vacuum in said first motor decreases below a certain value moving said control element and said cam against the action of said second motor.

6. In a fuel injection apparatus for an internal combustion engine having an air inlet passage connected with an inlet manifold, the combination of a fuel delivery pump adapted to supply fuel to the engine and having a control element movable for increasing and decreasing the fuel output of the pump, a first vacuum motor connected with said manifold so as to be responsive to changes in manifold pressure and thereby with engine load, a second vacuum motor connected with orifices provided in said passage so as to have a vacuum thereon varying with the speed of the engine, a cam acting on said control element for changing the output of the pump a lever connecting said first vacuum motor to said cam through a pin and slot connection to move said cam longitudinally; means connecting said second vacuum motor to said cam to move said cam transversely, so that pump output is increased with increasing engine load and decreased with increasing engine speed; and a second lever acted upon by said first lever and effective on said control element so as to move the control element to a position of minimum pump output when the vacuum in said first motor decreases below a certain value moving said control element and said cam against the action of said second motor.

References Cited in the file of this patent

UNITED STATES PATENTS

| | | |
|---|---|---|
| 2,136,959 | Winfield | Nov. 15, 1938 |
| 2,470,382 | Vanni | May 17, 1949 |
| 2,708,919 | Wellington et al. | May 24, 1955 |

FOREIGN PATENTS

| | | |
|---|---|---|
| 853,190 | France | Mar. 12, 1940 |
| 534,342 | Great Britain | Mar. 5, 1941 |